United States Patent
Sui et al.

(10) Patent No.: US 11,618,083 B2
(45) Date of Patent: Apr. 4, 2023

(54) LAYERED MODELING METHOD FOR LASER METAL DEPOSITION (LMD) THREE-DIMENSIONAL (3D) PRINTING

(71) Applicant: CHENGDU AIRCRAFT INDUSTRIAL(GROUP)CO., LTD., Chengdu (CN)

(72) Inventors: Shaochun Sui, Chengdu (CN); Peng Rong, Chengdu (CN); Dawei Wang, Chengdu (CN)

(73) Assignee: CHENGDU AIRCRAFT INDUSTRIAL(GROUP)CO., LTD., Chengdu (CN)

( * ) Notice: Subject to any disclaimer, the term of this patent is extended or adjusted under 35 U.S.C. 154(b) by 0 days.

(21) Appl. No.: 17/638,808

(22) PCT Filed: May 27, 2021

(86) PCT No.: PCT/CN2021/096503
§ 371 (c)(1),
(2) Date: Feb. 26, 2022

(87) PCT Pub. No.: WO2021/244402
PCT Pub. Date: Dec. 9, 2021

(65) Prior Publication Data
US 2022/0347753 A1 Nov. 3, 2022

(30) Foreign Application Priority Data
Jun. 1, 2020 (CN) .......................... 202010484779.4

(51) Int. Cl.
*B22F 10/80* (2021.01)
*B33Y 50/00* (2015.01)
(Continued)

(52) U.S. Cl.
CPC .............. *B22F 10/80* (2021.01); *B22F 10/25* (2021.01); *B22F 12/41* (2021.01); *B33Y 10/00* (2014.12); *B33Y 50/00* (2014.12)

(58) Field of Classification Search
CPC .......... B22F 10/80; B22F 10/25; B22F 12/41; B33Y 10/00; B33Y 50/00; G06T 17/00
(Continued)

(56) References Cited

U.S. PATENT DOCUMENTS

2020/0361155 A1* 11/2020 Jones ................. G01B 11/0608

FOREIGN PATENT DOCUMENTS

| CN | 104708824 A | 6/2015 |
| CN | 106202687 A | 12/2016 |

(Continued)

*Primary Examiner* — Michael J Brown
(74) *Attorney, Agent, or Firm* — Bayramoglu Law Offices LLC

(57) ABSTRACT

A layered modeling method for laser metal deposition (LIVID) 3D printing. The layered modeling method includes: obtaining estimated printing parameters of each layer in an entire digital model based on a process database; obtaining estimated feature points of each layer through the estimated parameters; comparing estimated feature points of each layer with feature points of a corresponding actual shape to obtain a difference in each layer; and accumulating to obtain a difference in the entire digital model to obtain corresponding printing parameters. The layered modeling method has the advantages of effectively reducing the calculation amount during data comparison and greatly saving time.

4 Claims, 2 Drawing Sheets

(51) Int. Cl.
*B33Y 10/00* (2015.01)
*B22F 12/41* (2021.01)
*B22F 10/25* (2021.01)
*G06T 17/00* (2006.01)

(58) Field of Classification Search
USPC .......................................................... 700/119
See application file for complete search history.

(56) References Cited

FOREIGN PATENT DOCUMENTS

| | | | |
|---|---|---|---|
| CN | 106256536 | A | 12/2016 |
| CN | 106427249 | A | 2/2017 |
| CN | 106600690 | A | 4/2017 |
| CN | 107599412 | A | 1/2018 |
| CN | 107803987 | A | 3/2018 |
| CN | 107806843 | A | 3/2018 |
| CN | 108724734 | A | 11/2018 |
| CN | 108971424 | A | 12/2018 |
| CN | 109079136 | A | 12/2018 |
| CN | 109522585 | A | 3/2019 |
| CN | 110052607 | A | 7/2019 |
| CN | 111730057 | A | 10/2020 |
| EP | 3569332 | A1 | 11/2019 |
| WO | 2016132164 | A1 | 8/2016 |

\* cited by examiner

LAYERED MODELING METHOD FOR LASER METAL DEPOSITION (LMD) THREE-DIMENSIONAL (3D) PRINTING

CROSS REFERENCE TO THE RELATED APPLICATIONS

This application is the national phase entry of International Application No. PCT/CN2021/096503, filed on May 27, 2021, which is based upon and claims priority to Chinese Patent Application No. 202010484779.4, filed on Jun. 1, 2020, the entire contents of which are incorporated herein by reference.

TECHNICAL FIELD

The present invention relates to the technical field of three-dimensional (3D) printing, and more particularly, to a layered modeling method for laser metal deposition (LIVID) 3D printing.

BACKGROUND 3D printing technology, born in the 1980s, realizes the establishment of mathematical models. It is a bottom-up manufacturing technology called additive manufacturing in contrast to traditional subtractive manufacturing. Since its birth, 3D printing technology has received widespread attention and thus developed rapidly. In recent decades, 3D printing technology has become a center of attention and been used in industrial design, construction, automobile, aerospace, dentistry, education and other fields, however, its application and development are still restricted by various factors. In addition to parameters of the equipment and the printing process, the shape detection of parts is also a key factor affecting the quality of 3D printed products.

LIVID 3D printing is a technology that metallic powder forms a molten pool under the action of a laser beam and offers movable laser spots to achieve sintering (or fusion). This technology can be directly used to produce molds and parts. Since the laser works in vacuum, the castings produced thereby have much higher strength than ordinary castings, thus having a wider range of applications.

In the prior art, an entire digital model is usually compared with an actual model directly regardless of the forms adopted such as blue light, raster or 3D reverse engineering, which may incur the following two problems.

1. A huge amount of data processing needs to be performed in the digital model. Traditionally, a theoretical digital model is compared with the actual model. Given that a 3D digital model is composed of millions or even tens of millions of points, the comparison between digital models is equivalent to a separate comparison among millions of points, which results in a huge amount of data processing.

2. The processing is very slow. Since a large number of points need to be compared, high requirements are imposed on the processor and the processing algorithm, but an extremely long period of time is still required to reach a processing result.

SUMMARY

An objective of the present invention is to provide a layered modeling method for LIVID 3D printing, effectively reducing the calculation amount during data comparison and greatly saving time.

The present invention is implemented by the following technical solution:

A layered modeling method for LIVID 3D printing includes: obtaining estimated printing parameters of each layer in an entire digital model based on a process database; obtaining estimated feature points of each layer through the estimated parameters; comparing the estimated feature points of each layer with feature points of a corresponding actual shape to obtain a difference in each layer; and accumulating to obtain a difference in the entire digital model to obtain corresponding printing parameters.

Further, in order to better implement the present invention, the method includes:

S1: obtaining printing parameters of an N-th layer;

S2: estimating a printing shape of the N-th layer from the process database based on the printing parameters of the N-th layer;

S3: identifying feature points of the N-th layer based on the estimated printing shape of the N-th layer, and dividing an image identification area based on the feature points;

S4: comparing the estimated printing shape of the N-th layer with a corresponding shape in the process database to obtain a difference in a printing shape of the N-th layer;

S5: estimating and combining printing shapes of N layers to obtain a difference in the entire digital model; and S6: obtaining printing parameters of an (N+1)-th layer from the process database based on the difference in the entire digital model.

Further, in order to better implement the present invention, in step S3, the step of dividing the image identification area based on the feature points includes: comparing the obtained feature points with a shape in the process database to obtain the image identification area.

Further, in order to better implement the present invention, step S4 includes: comparing the printing shape of the N-th layer with the corresponding shape in the process database based on the image identification area to obtain the difference in the printing shape of the N-th layer.

Compared with the prior art, the present invention has the following advantages.

1. The present invention greatly reduces the calculation amount during data comparison by layering the entire digital model and comparing the feature points.

2. The present invention matches the theoretical digital model with the actual digital model, avoiding the situation where a feature point needs to be matched in a point cloud composed of millions of points, thereby greatly saving time.

DETAILED DESCRIPTION OF THE EMBODIMENTS

Figure 1:
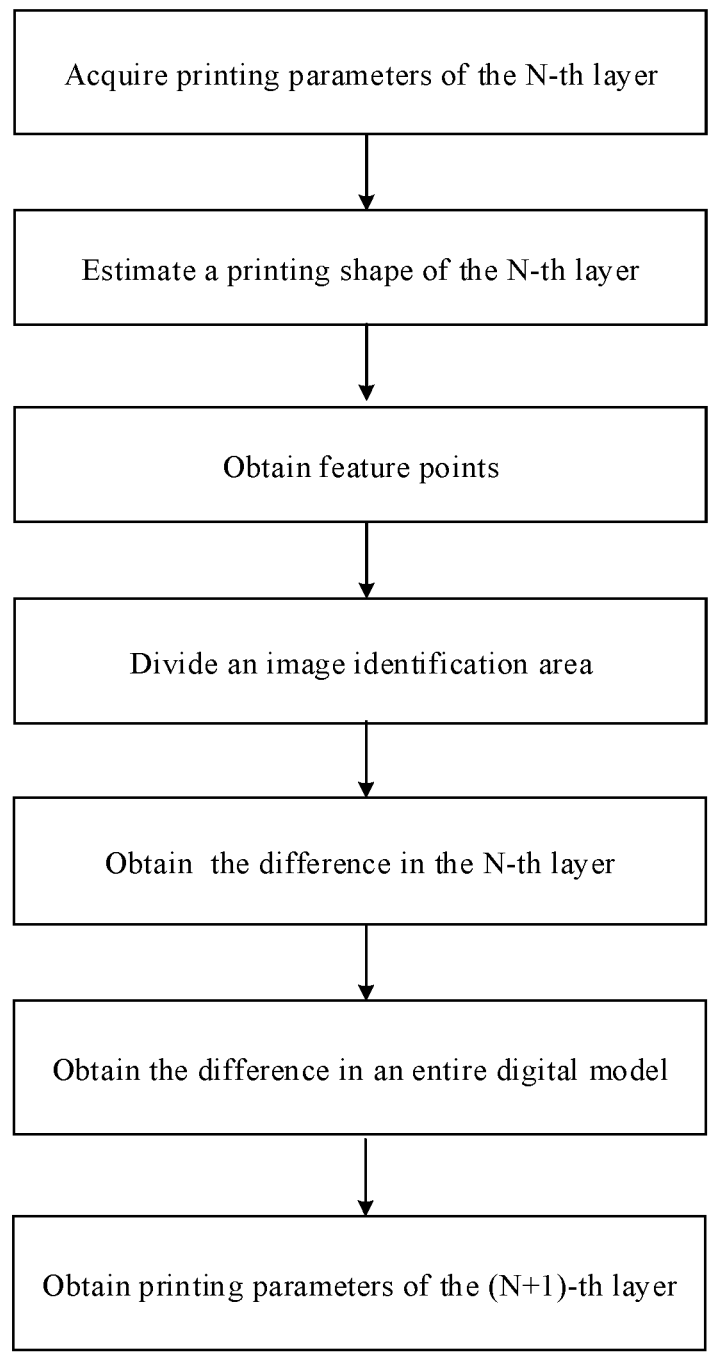
FIG. 1 is a flowchart of the present invention.

The embodiments of the present invention are described below in detail. The embodiments are exemplarily shown in the drawings. The same or similar numerals represent the same or similar elements, or elements having the same or similar functions throughout the specification. The embodiments described below with reference to the drawings are illustrative, which are merely intended to explain the present invention, rather than to limit the present invention.

It should be understood that, in the description of the present invention, the terms such as "central", "longitudinal", "transverse", "long", "wide", "thick", "upper", "lower", "front", "back", "left", "right", "vertical", "horizontal", "top", "bottom", "inner", "outer", "clockwise" and "anticlockwise" are intended to indicate orientations and positional relations shown in the drawings. It should be noted that these terms are merely intended to facilitate a simple description of the present invention, rather than to indicate or imply that the mentioned apparatus or elements must have the specific orientation or be constructed and operated in the specific orientation. Therefore, these terms may not be construed as a limitation to the present invention.

In the present invention, unless otherwise clearly specified, meanings of terms "install", "connect with", "connect to", and "fixed" should be understood in a broad sense. For example, the connection may be a fixed connection, a detachable connection, or an integral connection; it may be a mechanical connection or an electrical connection; it may be a direct connection or an indirect connection via a medium; or it may be an internal communication between two components. Those of ordinary skill in the art may understand specific meanings of the above terms in the present invention based on a specific situation.

The present invention is further described below with reference to the embodiments, but the implementations of the present invention are not limited thereto.

In some embodiments, the present invention is implemented by the following technical solution. A layered modeling method for LIVID 3D printing includes: obtaining estimated printing parameters of each layer in an entire digital model based on a process database; obtaining estimated feature points of each layer through the estimated parameters; comparing the estimated feature points of each layer with feature points of a corresponding actual shape to obtain a difference in each layer; and accumulating to obtain a difference in the entire digital model to obtain corresponding printing parameters.

It should be noted that through the above improvements, the process database includes a theoretical shape of the layered digital model. The present invention obtains the estimated parameters of each layer based on the process database. The process database stores a large amount of experimental data, for example, actual shapes obtained under parameters such as various powder feeding volumes, air feeding volumes, laser powers, and printing speeds. The data is subjected to a preprocessing based on estimated printing shapes. The preprocessing is to reasonably layer the digital model and find the appropriate feature points in each layer. By layering the entire digital model and comparing the feature points, the calculation amount during data comparison can be greatly reduced. Moreover, the theoretical digital model can be quickly matched with the actual digital model, so as to avoid the situation where a feature point needs to be matched in a point cloud composed of millions of points, thereby greatly saving time.

In some embodiments, optimization is further performed on the above embodiments, and as shown in FIG. 1, the present invention specifically includes the following steps:

S1: printing parameters of the N-th layer are acquired to obtain an actual shape of a sub-digital model of the N-th layer;

S2: a printing shape of the N-th layer is estimated from the process database based on the printing parameters of the N-th layer;

S3: feature points of the N-th layer are identified based on the estimated printing shape of the N-th layer, and an image identification area is divided based on the feature points;

S4: the estimated printing shape of the N-th layer is compared with a corresponding shape in the process database to obtain the difference in the printing shape of the N-th layer;

S5: printing shapes of N layers are estimated and combined to obtain the difference in the entire digital model;

S6: printing parameters of the (N+1)-th layer are obtained from the process database based on the difference in the entire digital model.

It should be noted that through the above improvements, the printing parameters here include powder feeding volume, air feeding volume, laser power, printing speed, and the actual shape obtained under the combination of the above parameters.

Other parts of these embodiments are the same as those of the above embodiments, and will not be repeated herein.

In some embodiments, optimization is further performed on the above embodiments. As shown in FIG. 1, in order to better implement the present invention, in step S3, the step of dividing the image identification area based on the feature points includes: comparing the obtained feature points of the N-th layer with the actual shape to obtain the image identification area.

Other parts of these embodiments are the same as those of the above embodiments, and will not be repeated herein.

In some embodiments, optimization is further performed on the above embodiments. As shown in FIG. 1, in order to better implement the present invention, step S4 includes: comparing the printing shape of the N-th layer with the corresponding shape in the process database based on the image identification area to obtain the difference in the printing shape of the N-th layer.

Other parts of these embodiments are the same as those of the above embodiments, and will not be repeated herein.

The most preferred embodiment of the present invention is as follows. As shown in FIG. 1, the method includes the following steps: S1: printing parameters of the N-th layer are acquired to obtain an actual shape of a sub-digital model of the N-th layer;

S2: a printing shape of the N-th layer is estimated from the process database based on the printing parameters of the N-th layer;

S3: feature points of the N-th layer are identified based on the estimated printing shape of the N-th layer, and the obtained feature points of the N-th layer are compared with the actual shape to obtain the image identification area;

S4: the printing shape of the N-th layer is compared with a corresponding shape in the process database based on the image identification area to obtain the difference in the printing shape of the N-th layer;

S5: printing shapes of N layers are estimated and combined to obtain the difference of the entire digital model;

S6: printing parameters of the (N+1)-th layer are obtained from the process database based on the difference in the entire digital model.

Figure 2:
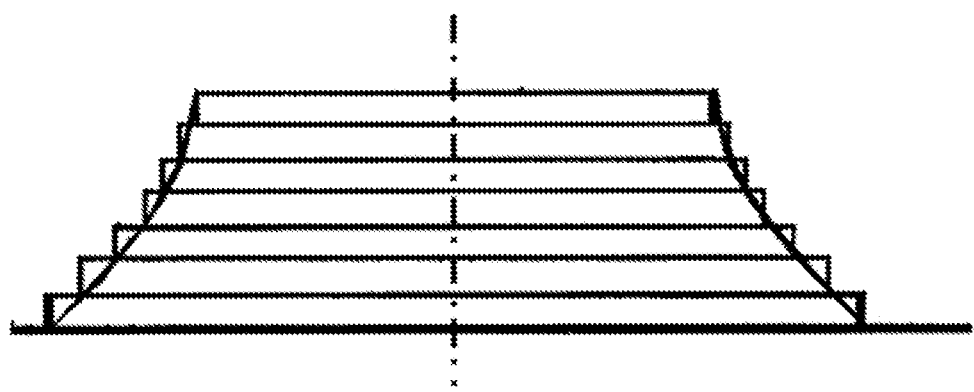
FIG. 2 is a schematic view of Embodiment 5 of the present invention.

It should be noted that through the above improvements, as shown in FIG. 2, the entire digital model is a cone. After the printing parameters are obtained, it is estimated that the printed actual shape is a trapezoid composed of a plurality of long strips. The long strips in FIG. 2 are independent image identification areas. The feature points in the plurality of long-strip image identification areas are identified, and compared with feature points on an actual image to obtain the difference in each image identification area. These differences are accumulated to obtain the difference between the entire digital model and the theoretical digital model.

During printing, after a first layer is printed, a second layer is printed normally on the basis of supplementing a missing area, and on the rest can be done in a similar way to complete the printing of the actual shape.

Other parts of these embodiments are the same as those of the above embodiments, and will not be repeated herein.

The above descriptions are only the preferred embodiments of the present invention and are not intended to limit the present invention in any form. Any simple modifications and equivalent changes and modifications made to the above embodiments according to the technical essence of the present invention shall fall within the scope of the technical solution of the present invention.

What is claimed is:

1. A layered modeling method for laser metal deposition (LMD) three-dimensional (3D) printing, comprising:
    obtaining estimated printing parameters of each layer in an entire digital model based on a process database;
    obtaining estimated feature points of each layer through the estimated parameters;
    during each layer, comparing the estimated feature points of each layer with feature points of a corresponding actual shape to obtain a difference in each layer; and
    accumulating the difference in each layer to obtain a difference in the entire digital model to obtain corresponding printing parameters.

2. The layered modeling method for the LIVID 3D printing according to claim 1, wherein the layered modeling method specifically comprises:
    S1: obtaining printing parameters of an N-th layer;
    S2: estimating a printing shape of the N-th layer from the process database based on the printing parameters of the N-th layer to obtain an estimated printing shape;
    S3: identifying feature points of the N-th layer based on the estimated printing shape of the N-th layer, and dividing an image identification area based on the feature points;
    S4: comparing the estimated printing shape of the N-th layer with a corresponding shape in the process database to obtain a difference in a printing shape of the N-th layer;
    S5: estimating and combining printing shapes of N layers to obtain a difference in the entire digital model; and
    S6: obtaining printing parameters of an (N+1)-th layer from the process database based on the difference in the entire digital model.

3. The layered modeling method for the LIVID 3D printing according to claim 2, wherein in step S3, the step of dividing the image identification area based on the feature points comprises: comparing the feature points with a shape in the process database to obtain the image identification area.

4. The layered modeling method for the LIVID 3D printing according to claim 3, wherein step S4 comprises: comparing the printing shape of the N-th layer with the corresponding shape in the process database based on the image identification area to obtain the difference in the printing shape of the N-th layer.

* * * * *